United States Patent
Boose (10) Patent No.: US 7,831,948 B2
(45) Date of Patent: Nov. 9, 2010

(54) METHOD AND SYSTEM FOR AUTOMATICALLY GENERATING SCHEMATICS

(75) Inventor: John H. Boose, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 21 days.

(21) Appl. No.: 11/346,103

(22) Filed: Feb. 2, 2006

(65) Prior Publication Data

US 2007/0180421 A1 Aug. 2, 2007

(51) Int. Cl.
*G06F 9/455* (2006.01)
*G06F 17/50* (2006.01)

(52) U.S. Cl. .............................. 716/11; 716/4; 715/211; 707/736

(58) Field of Classification Search ...................... 716/4, 716/11; 707/1, 736; 700/95; 715/200, 700, 715/211
See application file for complete search history.

(56) References Cited

U.S. PATENT DOCUMENTS

| | | | |
|---|---|---|---|
| 6,360,230 B1* | 3/2002 | Chan et al. | 707/103 R |
| 6,557,002 B1* | 4/2003 | Fujieda et al. | 707/102 |
| 6,606,731 B1 | 8/2003 | Baum et al. | |
| 6,721,745 B2* | 4/2004 | Monestere, III | 707/10 |
| 7,013,028 B2* | 3/2006 | Gont et al. | 382/113 |
| 7,099,809 B2* | 8/2006 | Dori | 703/6 |
| 7,178,112 B1* | 2/2007 | Ciolfi et al. | 716/1 |
| 2001/0031102 A1* | 10/2001 | Lunetta et al. | 382/284 |
| 2002/0023107 A1* | 2/2002 | Gont et al. | 707/504 |
| 2002/0191848 A1 | 12/2002 | Boose et al. | |
| 2003/0025734 A1 | 2/2003 | Boose et al. | |
| 2004/0034497 A1* | 2/2004 | Shah et al. | 702/127 |
| 2005/0114096 A1 | 5/2005 | Baum et al. | |
| 2005/0154558 A1 | 7/2005 | Baum et al. | |
| 2006/0101368 A1* | 5/2006 | Kesarwani et al. | 716/11 |
| 2006/0190116 A1* | 8/2006 | Almeida et al. | 700/102 |

* cited by examiner

*Primary Examiner*—Thuan Do
*Assistant Examiner*—Nha T Nguyen
(74) *Attorney, Agent, or Firm*—Yee & Associates, P.C.; Sean Casey (57) ABSTRACT

Method and system for automatically generating schematic diagrams of an assembly is provided. The method includes providing one or more identifiers for an assembly, the identifiers providing index to an assembly and component database. A plurality of components for the assembly is retrieved from the database based on the identifiers received. A list of component data, configuration data, location data and bundling data for each of the components, a plurality of schematic diagrams associated with each of the component and its inter-connection with other components within the assembly based on the identifiers are generated. The data generated for each of the components are organized and indexed to associate the identifiers with the assembly and related data of the components.

12 Claims, 8 Drawing Sheets

Figure 9

METHOD AND SYSTEM FOR AUTOMATICALLY GENERATING SCHEMATICS

CROSS REFERENCE TO RELATED APPLICATIONS

None

BACKGROUND

1. Field of Invention

This invention relates generally to computing systems, and in particular, to a method and system for automatically generating schematic drawings.

2. Background of the Invention

Schematic diagrams are used to illustrate complex and non-complex assemblies/systems (used interchangeably throughout this specification). These assemblies often have more than one component. Components, as used in this application, refer to any type of element that is part of a system/assembly. Often the components are interconnected either individually or as a part of sub-assemblies. For example, in electrical wiring diagrams, components include modules, plugs, switches, buses, power sources, grounds, wires, connectors, etc.

Traditionally, printed schematic diagrams have been used to show the location, description and configuration of each component in a system. In complex systems, these schematic diagrams can span multiple sheets. The printed schematic sheets are difficult to use, especially when systems have to be maintained/repaired. For example, when a user has to troubleshoot a problem dealing with one or more components, the user often has to refer to a manual. The user then tries to locate the component(s) by going over the multiple sheets and then tries to trouble shoot the problem. This becomes especially cumbersome when a component is revised.

Continuous effort is being made to use electronic schematic drawings: instead of printed hard copies. When schematic diagrams have to be assembled for a specific purpose such as certification from governmental or regulation authorities, configuration control, or for delivery confirmation a mere schematic diagram of the assembly may not be enough. Often such requirements are fulfilled by using a schematic model with a list of components, schematic diagrams for the components along with connectivity data for components, containment data, data bundles, location data and other type of information.

Therefore, what is needed is a method and system for automatically generating schematic diagrams and with appropriate component data.

SUMMARY OF THE INVENTION

In one aspect of the present invention, a method for generating schematic diagrams for an assembly is provided. providing one or more identifiers for an assembly, the identifiers providing an index to a database, the database comprising information regarding a plurality of assemblies, a plurality of components and interconnection of components; retrieving a plurality of components data for the assembly from the database based on the one or more identifiers; generating a plurality of schematic diagrams for the components and their inter-connection with other components within the assembly based on the identifiers; and creating an index to associate the one or more identifiers with the schematic diagrams and data of each of the components.

In another aspect of the present invention, a system for automatically generating a set of drawings for an assembly is provided. The system includes a processor executing a generator program, wherein the generator program. The generator program includes a receive module for receiving one or more identifiers for an assembly, the identifiers providing an index to a database, the database comprising information regarding a plurality of assemblies, a plurality of components and connectivity data for the components used in a plurality of assembly, the receive module retrieving a plurality of components and the corresponding data for an assembly from the database based on the one or more identifiers; an image generator module for generating a plurality of schematic diagrams for each of the component and its inter-connection with other components within the assembly based on the identifiers; and an index module for creating an index to associate the one or more identifiers with the assembly, the schematic diagrams of each of the components and the corresponding data of the components within the assembly.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. The illustrated embodiment is intended to illustrate, but not to limit the invention. The drawings include the following.

DETAILED DESCRIPTION OF THE PREFERRED EMBODIMENTS

In one aspect of the present invention, a system and process is provided to automatically generate schematic diagrams for components in an assembly based on one or more identifiers. The schematic diagrams are generated real-time online, thus eliminating use of hard-copy diagrams spanning multiple sheets. The identifiers provide an index to an assembly and component database as described below in detail.

To facilitate an understanding of the preferred embodiment, the general architecture and operation of a computing system will be described first. The specific process under the preferred embodiment will then be described with reference to the general architecture.

Computing System

Figure 1:
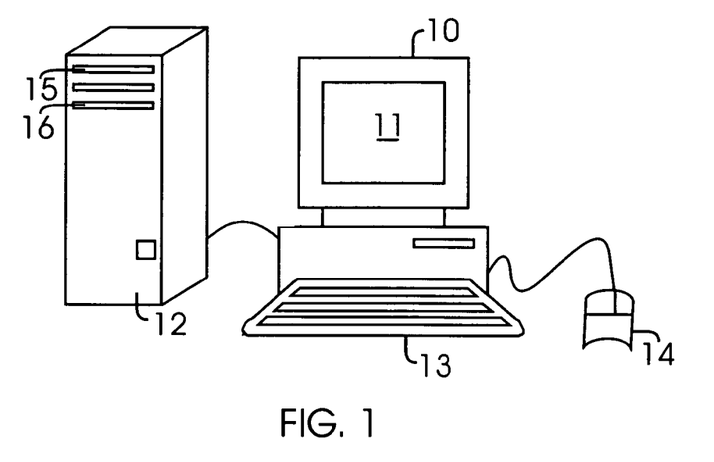
FIG. 1 shows a block diagram of a computing system for executing process steps, according to one aspect of the present invention.

FIG. 1 is a block diagram of a computing system for executing computer executable process steps according to one aspect of the present invention. FIG. 1 includes a host computer 10 (computer 10) and a monitor 11. Monitor 11 may be a CRT type, a LCD type, or any other type of color or monochrome display.

Also provided with computer 10 are a keyboard 13 for entering data and user commands, and a pointing device (for example, a mouse) 14 for processing objects displayed on monitor 11.

Computer 10 includes a computer-readable memory storage device 15 for storing readable data. Besides other programs, storage device 15 can store application programs including web browsers and computer executable code, according to the present invention.

According to one aspect of the present invention, computer 10 can also use removable storage device 16 for storing data files, application program files, and computer executable process steps embodying the present invention (for example: floppy disk drive, memory stick, CD-ROM, or CD R/W (read/write) or other device).

A modem, an integrated services digital network (ISDN) connection, or the like also provide computer 10 with a Network connection 12 (for example: Internet)—to the network of computers within a company or entity in the company (for example: Intranet). The network connection 12 allows computer 10 to download data files, application program files and computer-executable process steps embodying the present invention from the Internet.

Figure 2A:
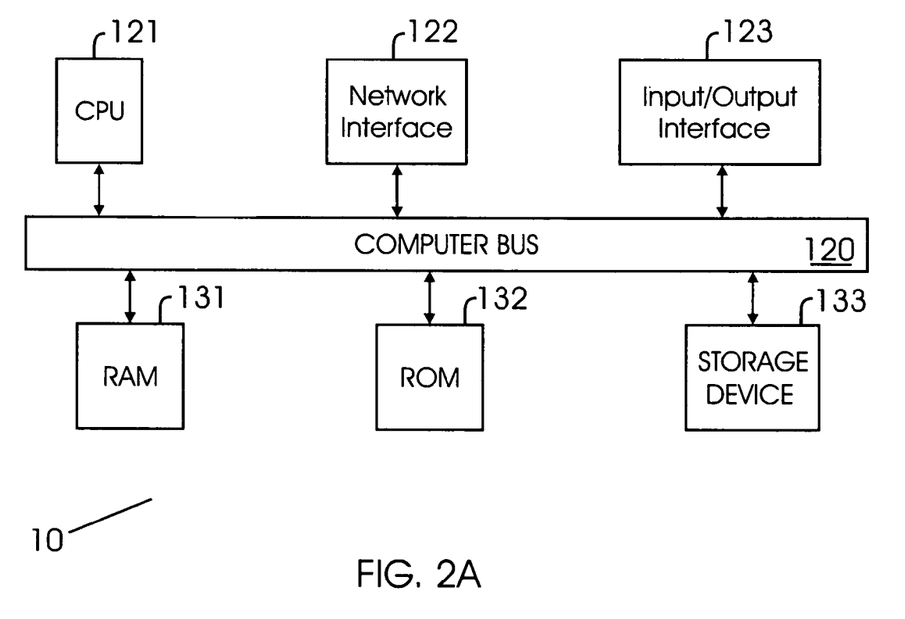
FIG. 2A shows the internal architecture of the computing system of FIG. 1.

FIG. 2A shows a top-level block diagram showing the internal functional architecture of a computing system 10 (host computer 10 or computer 10) that may be used to execute the computer-executable process steps, according to one aspect of the present invention. As detailed in FIG. 2A, computing system 10 includes a central processing unit (CPU) 121 for executing computer-executable process steps and interfaces with a computer bus 120.

Computing system 10 includes an input/output interface 123 that operatively connects output display device such as monitors (11), input devices such as keyboards (13) and pointing device such as a mouse (14) to the computing system 10.

A storage device 133 (similar to storage device 15) also interfaces to the computing system 10 through the computer bus 120. Storage device 133 may be disks, tapes, drums, integrated circuits, or the like, operative to hold data by any means, including magnetically, electrically, optically, and the like. Storage device 133 stores operating system program files, application program files, computer-executable process steps, web-browsers and other files. Some of these files are stored on storage device 133 using an installation program. For example, CPU 121 executes computer-executable process steps of an installation program so that CPU 121 can properly execute the application program.

Random access memory ("RAM") 131 also interfaces to computer bus 120 to provide CPU 121 with access to memory storage. When executing stored computer-executable process steps from storage device 133, CPU 121 stores and executes the process steps out of RAM 131.

Read only memory ("ROM") 132 is provided to store invariant instruction sequences such as start-up instruction sequences or basic input/output operating system (BIOS) sequences.

The computing system 10 can be connected to other computing systems through the network interface 122 using computer bus 120. The network interface 122 may be adapted to one or more of a wide variety of networks, including local area networks, storage area networks, wide area networks, the Internet, and the like.

In one aspect of the invention, an automatic diagram generator program 300 (generator 300, FIG. 3) to generate schematic diagrams may be supplied on a removable storage device 16 (for example: CD-ROM or a floppy disk), or alternatively could be read from the network via the network interface 122. In yet another aspect of the invention, the computing system 10 can load the generator 300 from other computer readable media such as magnetic tape, a ROM, integrated circuit, or a magneto-optical disk. Alternatively, generator 300 is installed onto the storage device 133 of the computing system 10 using an installation program and is executed using the CPU 121. In yet another aspect, generator 300 may be implemented by using an Application Specific Integrated Circuit (ASIC) that interfaces with computing system 10.

Figure 2B:
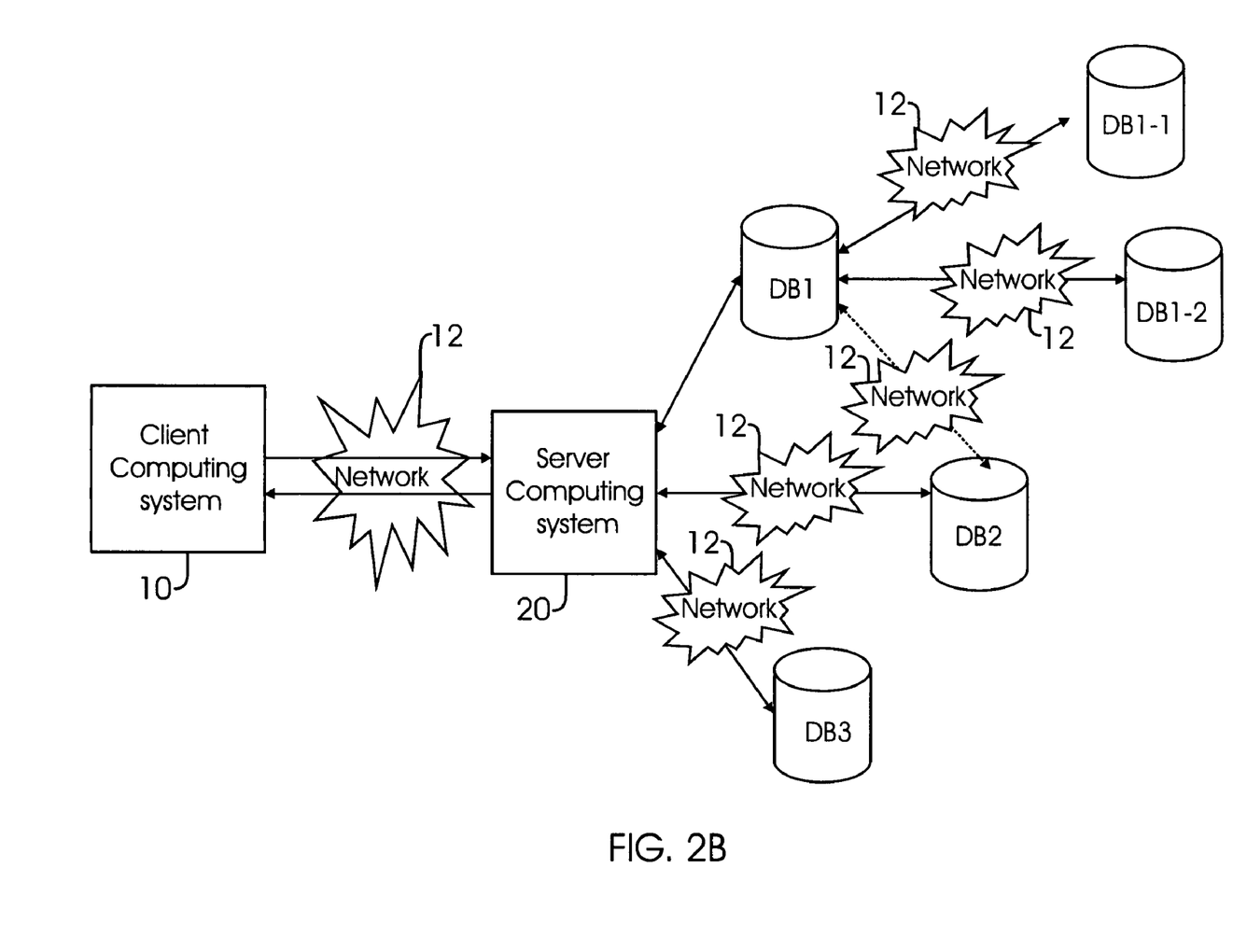
FIG. 2B illustrates a network with a computing system for executing the process steps, according to one aspect of the present invention.

FIG. 2B illustrates a client/server computing system, wherein a plurality of computers is interconnected through network connection 12 (network 12). In this system a computer that runs client software (referred to as a browser) is shown as a client computing system 10 or client 10 (computer 10 or computing system 10). A computer that runs server software is shown as a server computing system 20, or server 20. Server 20 provides resources that can be accessed and shared by clients 10. A browser on client 10 interacts with the server 20. The browser can be any general-purpose browser (such as Netscape's™ Communicator or Microsoft's™ Internet Explorer™) or a special-purpose browser that is capable of interacting with the server 20.

It is noteworthy that the present invention is not limited to the layout shown in FIGS. 1, 2A or 2B. For example, handheld computers, notebook or laptop computers, set-top boxes or any other computing system (wired or wireless) capable of connecting to the Internet and running computer-executable process steps, as described below, may be used to implement the various aspects of the present invention.

Figure 3:
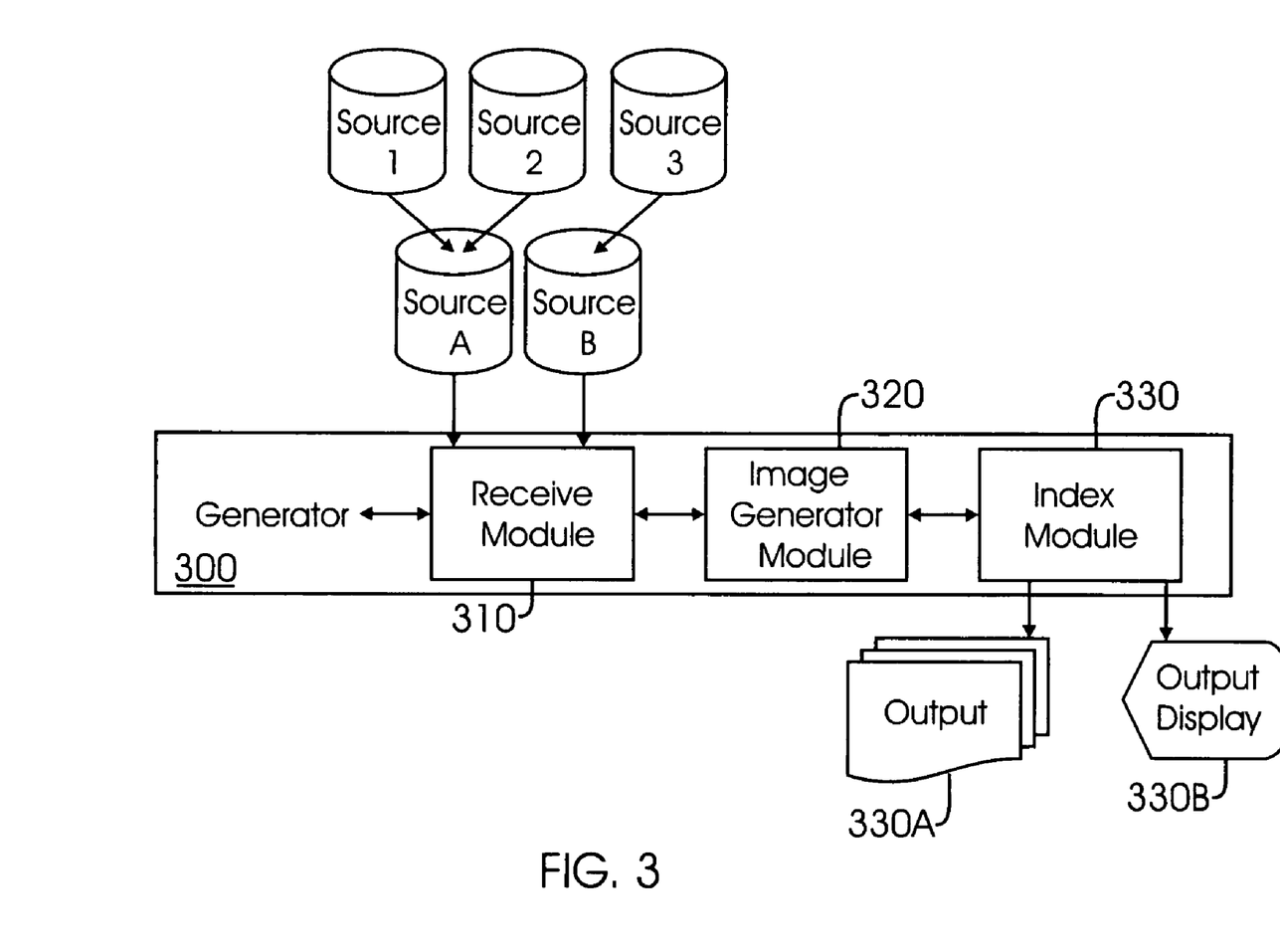
FIG. 3 shows a block diagram of a generator for automatically generating schematic drawings, according to one aspect of the present invention.

FIG. 3 shows a block diagram of an automatic diagram generator 300 (generator 300) according to one aspect of the present invention. Generator 300 may include a plurality of modules to carry out different steps of the current invention. A module in this application refers to a piece of software, hardware or ASIC that performs a particular function and can be combined with other modules. It is noteworthy that Generator 300 may be modular program code, a single code set, an ASIC to perform the adaptive aspects of the present invention.

Turning in detail to FIG. 3, Generator 300 includes a receive module 310 that receives a plurality of identifiers that identify an assembly. The identifiers can be received from a client 10. The term assembly, as used in this application, refers to a system that includes plural components and some or all components are either interconnected individually or connected as sub-assemblies. Identifiers received by the receive module 310 are assembly attributes that distinctly identify one or more assemblies. Some of the assembly attributes include any one or more of the following: (a) assembly name, (b) assembly identifier (ID), (c) text for assembly description, (d) assembly layout, (e) assembly revision as determined by engineering control, (f) assembly revision description, (g) assembly revision layout and/or (h) assembly revision date. The assembly attributes can also be used to identify one or more assembly component(s).

Assembly attributes can be used as indices for an assembly and component database. The assembly and component database store information about components/assemblies include connectivity data. This could be a consolidated database built based on a plurality of databases that store information about one or more assemblies and/or one or more components. The data includes connectivity data, containment data, bundling data, and location data for the components.

Connectivity data as used herein is data that provides connectivity information between components. Location data includes the location of the component within one or more assemblies. It is noteworthy that the same component could be located in more than one location in an assembly. In such cases, information about each location of the component within the assembly could be distinctly stored in the database as different records with each record defining a location within an assembly.

Containment data as used herein is data that shows the components that may inside larger components (hence the term "containment"). For example, a switch may be a part of a larger component. The bundled data as used herein is data that shows similar components that are physically or logically routed together. For example, wires can be "bundled" together.

The assembly and component database(s) can reside on a client 10 or on a server 20 connected to the client 10 through network 12 or on a plurality of computing systems networked together using network 12.

Referring back to FIG. 3, the receive module 310 may receive information (identifiers) regarding one or more assemblies from one or more sources (shown as Source A and Source B). Source A and Source B can be two different databases residing on: a) client 10, b) on a single server 20 networked to the client 10 using network 12, or c) on a plurality of servers 20 networked to the client 10 using network 12. Source A, can receives information from one or more sources (shown as Source 1 and Source 2). Source 1 and Source 2 may reside on the same server as Source A or on different servers. Source B can receive information from one or more sources (in this example, only a single source, Source 3 is shown) which can reside on the same server 20 or on a different server. It is noteworthy that the present invention is not limited to any particular number, type or layout of these data sources.

Generator 300 also includes an Image Generator Module 320 which interfaces with receive module 310. The Image Generator Module 320 generates schematic diagrams of the components using the data provided by the receive module 310.

Generator 300 also includes an Index Module 330 that interfaces with Image Generator Module 320. Index Module 330 gathers the schematic diagrams of the components generated by Image Generator Module 320, the corresponding data for the components and the assembly gathered from the assembly and component database(s). Index module 320 then organizes the information into separate directories and indexes the information using one or more identifiers. The output generated by Index module 320 can be saved as a report file 330A or displayed real-time on an output display device 330B. An example of an output display device could be a monitor 11.

Figure 4:
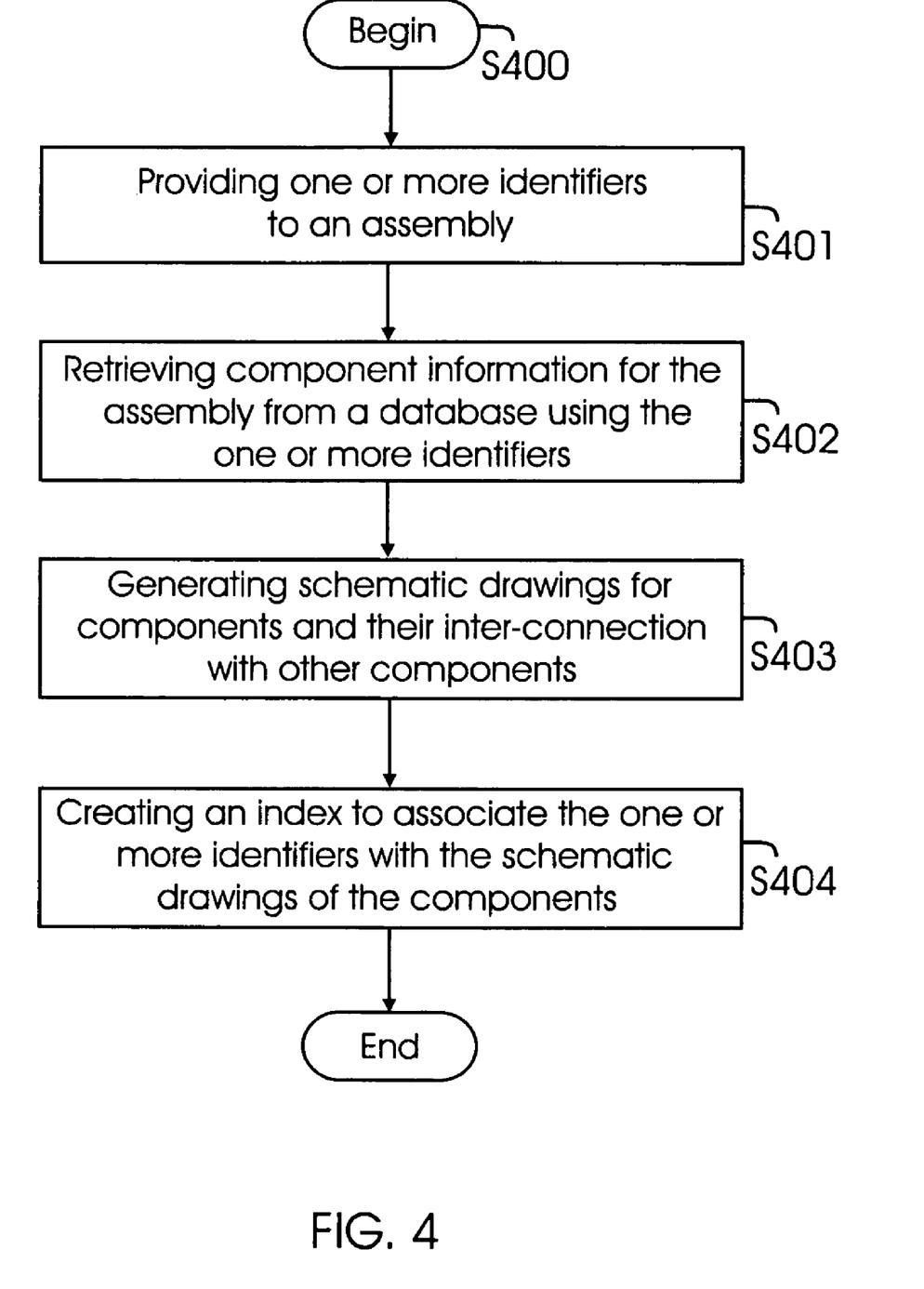
FIG. 4 shows a process flow diagram for generating schematic drawings, according to one aspect of the present invention.

Process Flow:

FIG. 4 shows a process flow diagram for automatically generating schematic drawings, according to one aspect of the present invention. The process begins at step S400. In step S401, one or more identifiers to an assembly are provided to receive module 310. As mentioned earlier, these identifiers are assembly attributes that distinctly describe an assembly and the corresponding components that make up the assembly. The assembly attributes provide indices to an assembly and component database that stores information about one or more assemblies and one or more components of the assembly.

In step S402, information regarding a plurality of components for the assembly is retrieved from one or more assembly and component database using the one or more assembly attributes. Step S402 is now described in detail below with respect to FIG. 5.

Figure 5:
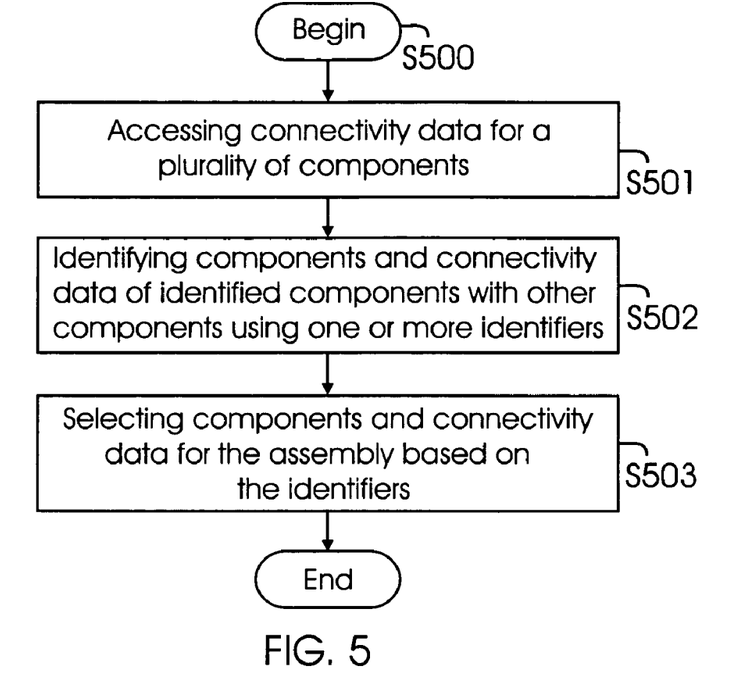
FIG. 5 shows a process flow diagram for step S402 of FIG. 4.

The process in FIG. 5 begins in step S500. In step S501, the receive module 310 uses the identifiers to access the assembly data, associated component data and connectivity information from one or more assembly and component database. The identifiers received by the receive module 310 provide the indices into the database(s).

In step S502, the components and the connectivity data of the components for the assembly are identified based on the identifiers received by the receive module 310. This could include inquiring one or more databases and filtering the results based on the identifiers.

In step S503, the identified assembly, its associated components and the corresponding connectivity data are selected by receive module 310. The image generator module 320 uses the selected components and the corresponding connectivity data to generate one or more schematic diagrams of the components and its connections within the assembly.

Turning back to details of FIG. 4, in step S403, image generator module 320 uses the components and the corresponding data related to the components identified by the receive module 310 and creates a plurality of schematic diagrams of the components within the assembly. The schematic diagrams can be generated using any image generator. In one aspect of the present invention, an image generator can produce a Computer Graphics Metafile to show the schematics. Computer Graphics Metafile is a standard format for technical drawings. An example of an image generator is provided in the US Patent Application entitled "Method, system and computer program product for automatically generating a subset of task-based components from engineering and maintenance data" Ser. No. 10/720,714, Publication No. 20050114096, filed on Nov. 24, 2003 and assigned to the assignee of the present application, and the disclosure of which is incorporated herein by reference in its entirety.

Image generator module 320 can generate various drawings and schematic diagrams based on the identifiers. Considering the example of aerospace industry, the image generator module 320 can generate drawings and schematic diagrams of a complete airplane system for a given tail number, sets of revision drawings for an entire fleet based on implementation of a given Service Bulletin or other modification—both pre- and post-modifications, set of all wiring bundles for a given tail number, all unique signal paths for a given tail number, all connectors for a given tail number, all revisions between two dates for a given tail number, fleet, or an airplane system. The term tail number, in this example, provides a distinct identifier for a specific model of an airplane.

In step S404, indices are created to associate the one or more identifiers with the plurality of schematic drawings of each component. The process of creating indices is explained in more detail with reference to FIG. 6.

Figure 6:
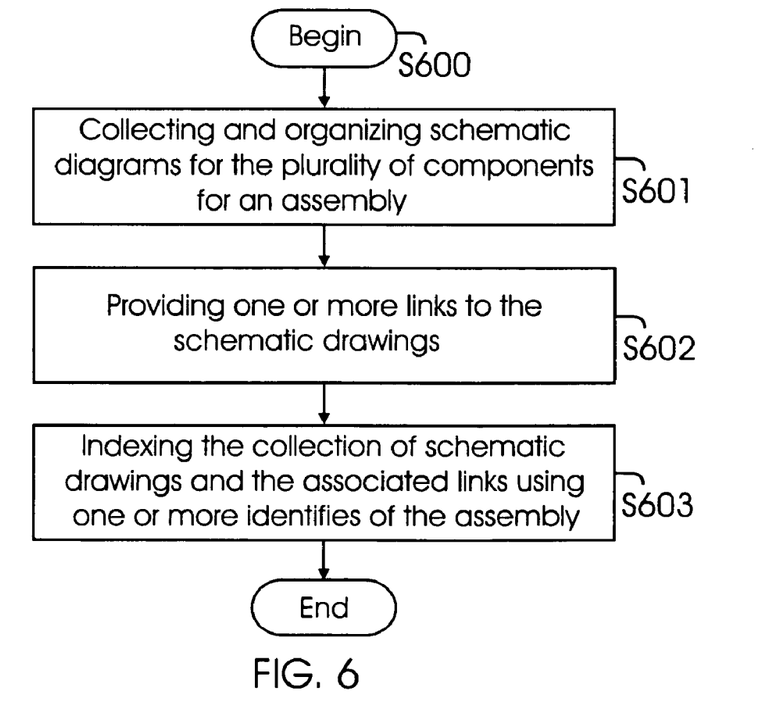
FIG. 6 shows a process flow diagram for step S404 of FIG. 4.

The process of creating indices begins at S600 of FIG. 6. Index module 330 is used to organize and index the data and diagrams for the assembly. In step S601, a plurality of schematic diagrams generated by image generator module 320 and the data identified by receive module 310 are collected and organized by index module 330.

Various techniques can be used to organize the data. One such technique is to organize the diagrams and data related to the assembly into directories. The directories could be organized based on the nature of the data collected. For example: Referring to the aforementioned airline example, textual description of the components in the assembly could be organized in one directory, the schematic diagrams into another, the connectivity data including textual and schematic diagrams related to connectivity data into yet another directory. Furthermore, service bulletin modifications can be organized in one main directory with pre-modifications in one sub-directory and post-modifications in another sub-directory under the main directory, component diagrams including connectivity data for the assembly can be included into another directory, components diagrams including connectivity data related to all revisions for a given date or for a given date range for the assembly could be in another directory, and all unique signal paths for a given airline in another directory and so on.

In step S602, index module 330 provides a plurality of links to the schematic drawings. One way of providing links is for the index module 330 to provide "hot" links for the components using one or more text identifiers of the assembly. The text identifiers distinctly distinguish each and every component and are used to "hot" link the identifiers to the actual components' schematic diagrams within the assembly. The text identifier links assist in textual search and browsing of components within the assembly panning to the appropriate component's position in the displayed schematic diagram when selected. Another way of providing links is to generate a plurality of thumbnails for each of the schematic diagrams that have been generated by image generator module 320. The thumbnails can be generated using any standard thumbnail file generator (for example: ThumbsPlus). The thumbnails will assist in visual image search and browsing of components within the assembly.

In step S603, the index module 330 collects data corresponding to the components including schematic diagrams and associated links, and indexes the data using one or more identifiers of the assembly. Some of the identifiers that can be used for indexing the component data could be assembly name, assembly identification, assembly description, directory location of the various directories created and organized in step S602.

Figure 7:
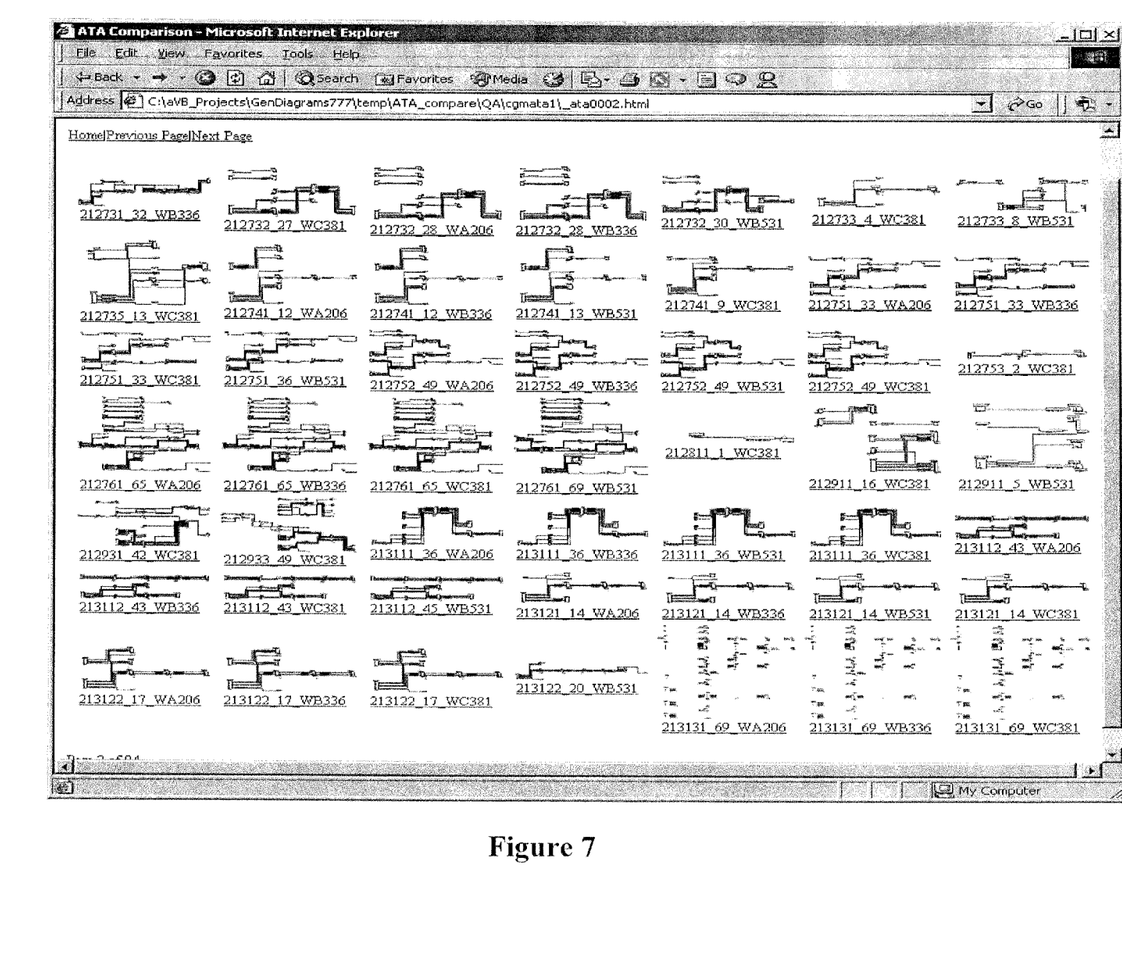
FIGS. 7 through 9 illustrate schematic diagrams generated by a generator, according to one aspect of the present invention.
Figure 8:
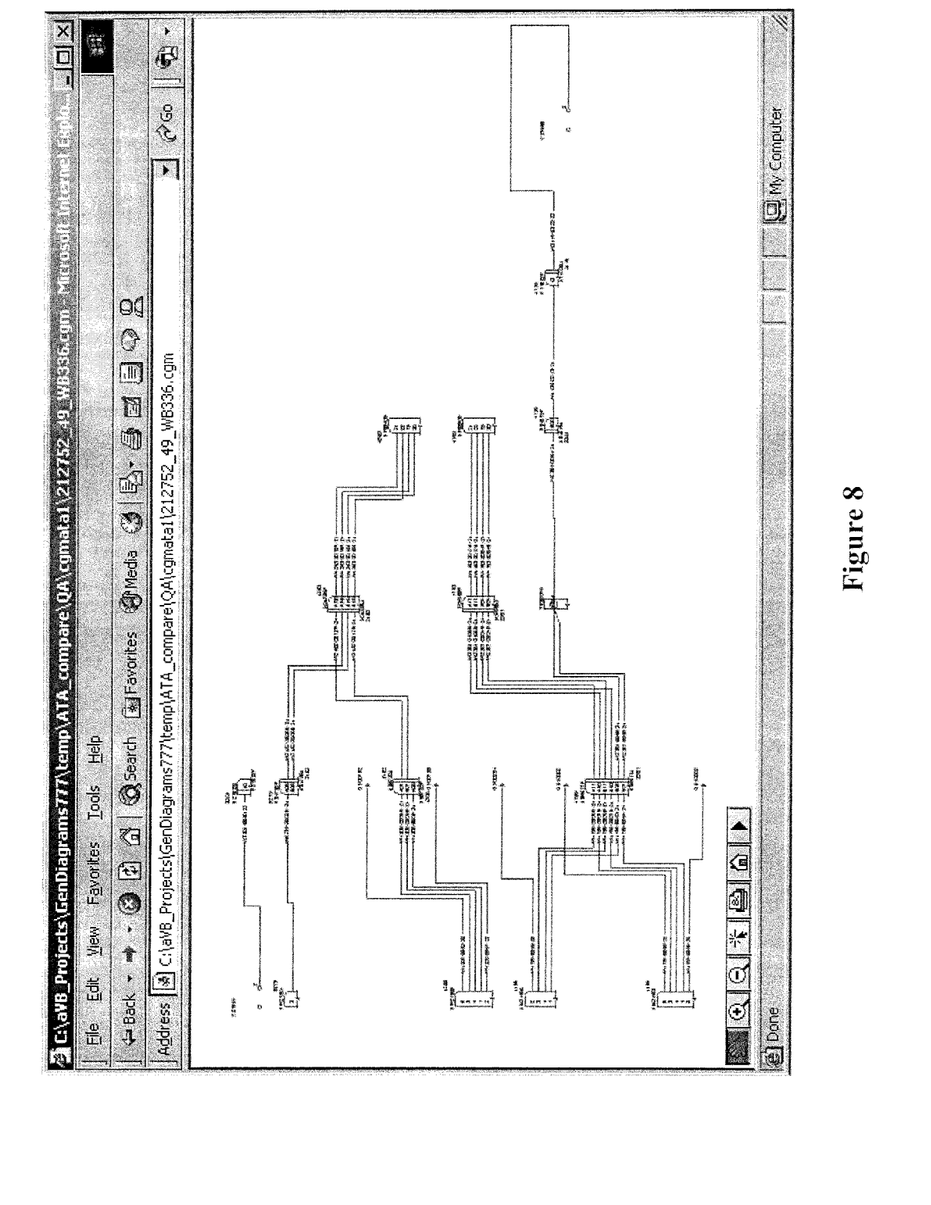
Figure 9:
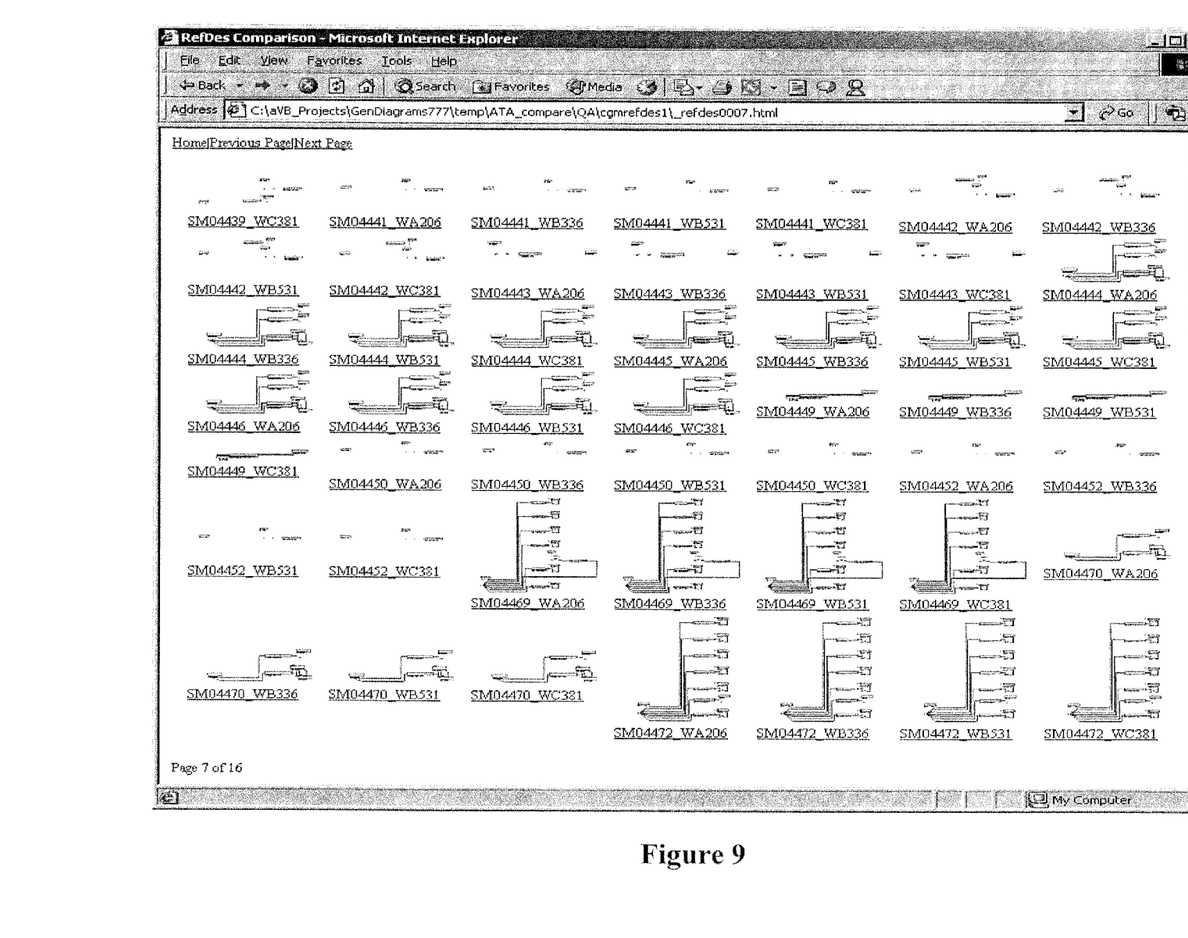

FIGS. 7 through 9 illustrate the results of the generator 300 for an assembly in aerospace industry, in one embodiment of the invention. FIG. 7 illustrates the set of various components that are used in the fleet of four 777 airplane. The set contains about 13,000 drawings automatically generated from an airplane database using a tail number identifier.

FIG. 8 illustrates an individual airplane system from the set shown in FIG. 7. FIG. 9 illustrates the index of the drawing set across a fleet of four 777 airplanes. This set contains 1,566 automatically generated drawings.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for automatically generating a set of drawings for an assembly, comprising:
   providing one or more identifiers for an assembly, the identifiers for the assembly providing an index to a database, the database comprising information regarding a plurality of assemblies, a plurality of components and interconnection of components;
   retrieving, by using a computer, a plurality of components data for the assembly from the database based on the one or more identifiers for the assembly by inquiring the database and filtering the results based on one or more identifiers;
   generating a plurality of schematic diagrams for the components and their inter-connection with other components within the assembly based on the identifiers for the assembly, using the retrieved components data; and
   creating another index, the created another index associating the one or more identifiers for the assembly with the generated schematic diagrams, their inter-connection with other components and data of each of the components of the assembly;
   wherein creating another index comprises:
   collecting the schematic drawings and data corresponding to the plurality of components for the assembly from the database, the schematic drawings and data identified using the one or more identifiers for the assembly;
   creating one or more links associated with the schematic drawings and the corresponding data of the plurality of components; and
   indexing the collection of schematic drawings, corresponding data and the associated links using the one or more identifiers of the assembly; and
   wherein creating one or more links comprises:
   generating a set of thumbnails for each of the schematic diagrams of the components in the assembly; and
   providing a link associating each of the thumbnails to the associated schematic diagrams of the component.

2. The method of claim 1, wherein the information in the database includes data related to a plurality of assemblies and a plurality of components, said data including connectivity data, containment data, data bundles, and location data.

3. The method of claim 1, wherein retrieving a plurality of components for the assembly from a database further comprising:
   accessing the database comprising data for a plurality of assemblies including assembly components and assembly component interconnections;
   identifying an assembly using the identifiers; and
   selecting one or more assembly components associated with the identified assembly.

4. The method of claim 1, wherein indexing the collection further comprising:
   organizing the schematic diagrams and corresponding data of each of the components into separate directories; and
   indexing the schematic diagrams and corresponding data of the components in each of the directories based on the one or more identifiers for the assembly.

5. The method of claim 4, wherein the created index is a textual index.

6. The method of claim 1, wherein the schematic diagram is generated using a drawing generator.

7. The method of claim 1, wherein the one or more identifiers for the assembly distinctly describe the assembly and is chosen from a group consisting of assembly name, assembly identification, assembly description, assembly layout, assembly revision, assembly revision description and assembly revision layout.

8. A system used for automatically generating a set of drawings for an assembly, comprising a processor executing a generator program, wherein the generator program comprising:

a receive module for receiving one or more identifiers for an assembly, the identifiers for the assembly providing an index to a database, the database comprising information regarding a plurality of assemblies, a plurality of components and connectivity data for the components used in a plurality of assembly, the receive module retrieving a plurality of components and the corresponding connectivity data for the components for an assembly from the database based on the one or more identifiers for the assembly by enquiring the database and filtering the results based on the one or more identifiers;

an image generator module for generating a plurality of schematic diagrams for each of the component and its inter-connection with other components within the assembly based on the identifiers for the assembly, using the retrieved data; and an index module configured to create another index, the created another index configured to associate the one or more identifiers with the assembly, the generated schematic diagrams of each of the component and its inter-connection with other components within the assembly;

wherein the index module further configured to:

collect the schematic drawings and data corresponding to the plurality of components for the assembly from the database, the schematic drawings and data identified using the one or more identifiers for the assembly;

create one or more links associated with the schematic drawings and the corresponding data of the plurality of components; and index the collection of schematic drawings, corresponding data and the associated links using the one or more identifiers of the assembly; and wherein create one or more links comprises:

generate a set of thumbnails for each of the schematic diagrams of the components in the assembly; and provide a link associating each of the thumbnails to the associated schematic diagrams of the component.

9. The system of claim 8, further comprising:

an input device to receive the identifiers for the assembly; and a display device to display the generated schematic diagrams and a graphic viewer to view the schematic diagrams.

10. A method for automatically generating drawings for an airplane, comprising:

providing a tail number for the airplane, the tail number for the airplane providing an index to a database, the database comprising information regarding a plurality of assemblies of the airplane, a plurality of components and interconnection of components of the airplane;

retrieving, by using a computer, a plurality of components data for the airplane from the database based on the tail number for the airplane, by inquiring the database and filtering the results based on the tail number;

generating a plurality of schematic diagrams for the components and their inter-connection with other components within the airplane based on the tail number of the airplane, using the retrieved components data; and creating another index, the created another index associating the tail number for the airplane with the generated schematic diagrams of the components, their inter-connection with other components and data of each of the components of the airplane;

wherein creating another index comprises:

collecting the schematic drawings and data corresponding to the plurality of components for the airplane from the database, the schematic drawings and data identified using the tail number for the airplane;

creating one or more links associated with the schematic drawings and the corresponding data of the plurality of components; and indexing the collection of schematic drawings, corresponding data and the associated links using the tail number of the airplane; and wherein creating one or more links comprises:

generating a set of thumbnails for each of the schematic diagrams of the components of the airplane; and providing a link associating each of the thumbnails to the associated schematic diagrams of the component.

11. The method of claim 10, wherein indexing the collection further comprising:

organizing the schematic diagrams and corresponding data of each of the components into separate directories; and indexing the schematic diagrams and corresponding data of the components in each of the directories based on the tail number for the airplane.

12. The method of claim 11, wherein the created index is a textual index.

* * * * *